US011009958B2

(12) United States Patent
Tuli

(10) Patent No.: US 11,009,958 B2
(45) Date of Patent: May 18, 2021

(54) METHOD AND APPARATUS FOR PROVIDING SIGHT INDEPENDENT ACTIVITY REPORTS RESPONSIVE TO A TOUCH GESTURE

(71) Applicant: NOKIA TECHNOLOGIES OY, Espoo (FI)

(72) Inventor: Apaar Tuli, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/680,948

(22) Filed: Nov. 12, 2019

(65) Prior Publication Data
US 2020/0081544 A1 Mar. 12, 2020

Related U.S. Application Data

(63) Continuation of application No. 13/053,888, filed on Mar. 22, 2011, now abandoned.

(51) Int. Cl.
*G06F 3/01* (2006.01)
*G06F 3/0488* (2013.01)

(52) U.S. Cl.
CPC .......... *G06F 3/016* (2013.01); *G06F 3/04883* (2013.01); *G06F 2203/04808* (2013.01)

(58) Field of Classification Search
CPC ............... G06F 3/016; G06F 3/04883; G06F 2203/04808
See application file for complete search history.

(56) References Cited

U.S. PATENT DOCUMENTS

| | | | |
|---|---|---|---|
| 7,966,578 B2 | 6/2011 | Tolmasky et al. | |
| 2004/0075676 A1 | 4/2004 | Rosenberg et al. | |
| 2008/0034294 A1 | 2/2008 | Ronkainen et al. | |
| 2008/0055241 A1 | 3/2008 | Goldenberg et al. | |
| 2008/0309632 A1 | 12/2008 | Westerman et al. | |
| 2009/0167508 A1 | 7/2009 | Fadell et al. | |
| 2010/0004033 A1* | 1/2010 | Choe ................ | H04M 1/72519 455/567 |
| 2010/0110018 A1 | 5/2010 | Faubert et al. | |

(Continued)

FOREIGN PATENT DOCUMENTS

| | | |
|---|---|---|
| EP | 1 873 620 A1 | 1/2008 |
| EP | 2 141 569 A2 | 1/2010 |

(Continued)

OTHER PUBLICATIONS

Examination Report for Australian Application No. 2012232659 dated Jan. 20, 2015.
International Search Report and Written Opinio for Application No. PCT/IB2012/051352 dated Sep. 6, 2012.
Notice of Grant for Australian Application No. 2012232659 dated Oct. 22, 2015.

(Continued)

*Primary Examiner* — Sahlu Okebato
(74) *Attorney, Agent, or Firm* — Alston & Bird LLP

(57) ABSTRACT

A method for providing sight independent activity reports responsive to a touch gesture may include receiving an indication of a pulse gesture being performed by at least two fingers with respect to a selectable item displayed at a touch screen display, determining a status with respect to activity associated with an application corresponding to the selectable item, and causing provision of haptic feedback to the at least two fingers based on the status. A corresponding apparatus and computer program product are also provided.

15 Claims, 13 Drawing Sheets

(56) References Cited

U.S. PATENT DOCUMENTS

| | | | |
|---|---|---|---|
| 2010/0156818 A1* | 6/2010 | Burrough | G06F 3/041 345/173 |
| 2010/0261505 A1* | 10/2010 | Yeh | G06F 3/04883 455/564 |
| 2010/0315212 A1 | 12/2010 | Radivojevic | |
| 2010/0315346 A1 | 12/2010 | Lindroos et al. | |
| 2011/0107272 A1 | 5/2011 | Aguilar | |
| 2012/0030568 A1 | 2/2012 | Migos et al. | |

FOREIGN PATENT DOCUMENTS

| | | |
|---|---|---|
| EP | 2 202 619 A1 | 6/2010 |
| GB | 2 468 275 A1 | 9/2010 |
| WO | WO 2009/015950 A2 | 2/2009 |

OTHER PUBLICATIONS

Office Action for Vietnamese Application No. 6493/SHTT-SCI dated Mar. 26, 2018, 2 pages.
Preliminary Examination for Malaysian Application No. PI 2013003409 dated Feb. 19, 2014.
Substantive Examination Adverse Report for Malaysian Application No. PI 2013003409 dated Apr. 15, 2016.
Supplementary European Search Report for Application No. EP 12 76 0908 dated Oct. 30, 2015.
Office Action for U.S. Appl. No. 13/053,888 dated Mar. 31, 2016, 23 pages.
Miller, P. "Samsung's AnyCall Haptic is out and UI-licious" [online] Retrieved from the Internet:<URL:http://www.engadget.com/2008/03/25/samsungs-anycall-haptic-is-out-and-ui-licious/> dated Mar. 25, 2008.

* cited by examiner

METHOD AND APPARATUS FOR PROVIDING SIGHT INDEPENDENT ACTIVITY REPORTS RESPONSIVE TO A TOUCH GESTURE

CROSS-REFERENCE TO RELATED APPLICATIONS

This application is a continuation of U.S. application Ser. No. 13/053,888, filed Mar. 22, 2011, the entire contents of which are incorporated herein by reference.

TECHNOLOGICAL FIELD

Some example embodiments of the present invention relate generally to user interface technology and, more particularly, relate to a method and apparatus for providing sight independent activity reports responsive to a touch gesture.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, electronic book or reading device, etc.

In many situations, it may be desirable for the user to interface with a device such as a mobile terminal for the provision of an application or service. A user's experience during certain applications such as, for example, web browsing or navigating through content may be enhanced by using a touch screen display as the user interface. Furthermore, some users may have a preference for use of a touch screen display for entry of user interface commands over other alternatives. In recognition of the utility and popularity of touch screen displays, many devices, including some mobile terminals, now employ touch screen displays. As such, touch screen devices are now relatively well known in the art, with numerous different technologies being employed for sensing a particular point at which an object may contact the touch screen display.

BRIEF SUMMARY

A method, apparatus and computer program product are provided to enable the provision of sight independent activity reports responsive to a touch gesture. In some cases, for example, a touch gesture may be provided to a selectable item on a touch screen display and the user may receive haptic feedback regarding the selectable item via the user's fingers, and therefore in a sight independent manner. Moreover, in some cases, the haptic feedback provided may be provided in a manner that is indicative of activity associated with an application associated with the selectable item Some embodiments of the invention may provide a method, apparatus and computer program product for improving user experience relating to devices having touch screen interfaces. As a result, for example, mobile terminal users may enjoy improved capabilities with respect to accessing information related to content and other services or applications that may be used in connection with a touch screen display.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
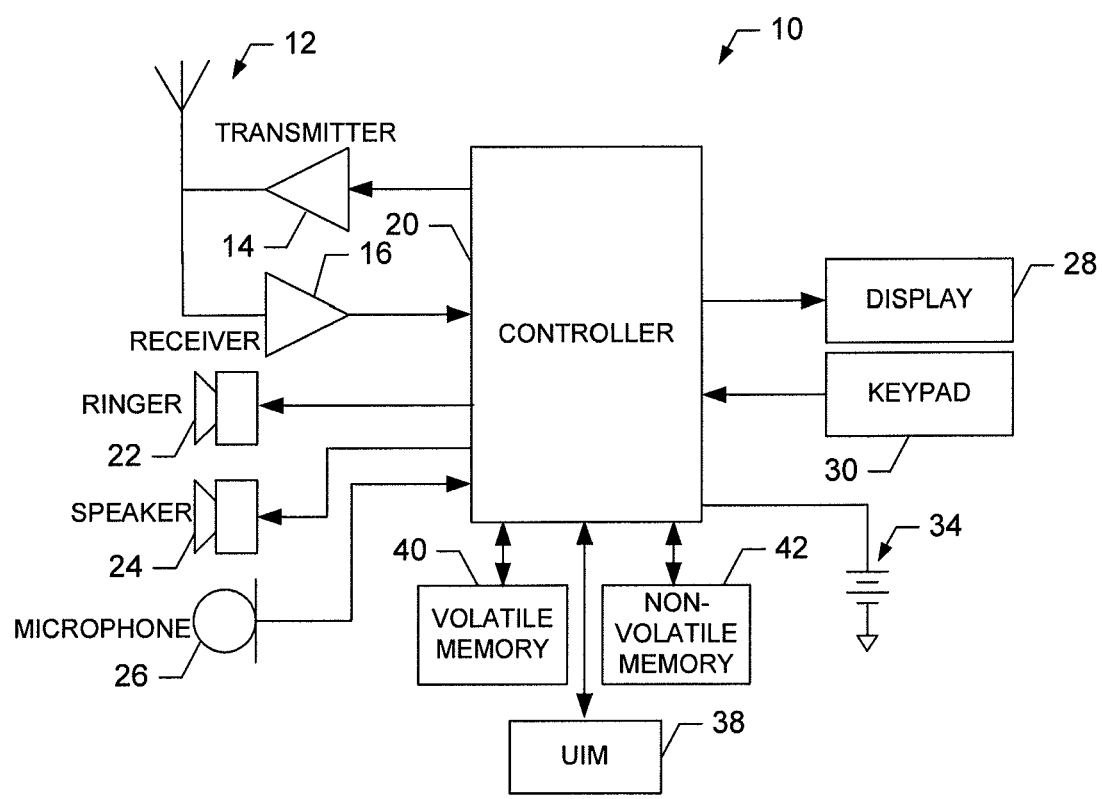
FIG. 1 is a schematic block diagram of a mobile terminal according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or any other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

The use of a touch screen interface is often attractive to users due to the generally intuitive nature of the interface. Various activities such as selecting an object, dragging an object, drawing a symbol, turning a page, zooming in or out, and/or the like, are often performed using simple gestures that seem to naturally coincide with the resulting activity. Thus, touch screen devices have been becoming increasingly popular.

The touch screen interface typically displays content on a display screen and also accepts tactile inputs from the user through the same touch screen. Thus, most touch screen devices are very dependent upon the user having the ability to spot items, select or otherwise interact with those items and then receive visual feedback (and sometimes also audio feedback) responsive to the selection. The touch screen interface is, therefore, quite often dependent upon a user's ability to have sighted engagement with the touch screen display.

There may, however, be instances in which it is desirable for the user to interact with the touch screen display without necessarily having an ability (or at least need) to see the touch screen display. For example, in some cases, users that are blind may wish to interact with touch screen devices, or users that are engaged in another task such as driving, cycling or walking down a busy street may wish to interact with their touch screen devices without devoting their visual attention to the task. In other cases, users may wish to discretely interact with their devices (e.g., in a pocket or under a table) in a manner that does not require them to visually sight the display. This may be useful in a meeting, during a movie, while engaged in conversation, in unsafe neighborhoods, crowded areas, or in numerous other situations.

Some example embodiments of the present invention may provide for an ability to receive sight independent activity reports responsive to a touch gesture on a touch screen display. The fact that such reports are sight independent does not mean that no visual contact between the user and the display is present. Instead, sight independence is meant to refer to the fact that visual contact is not required. Thus, example embodiments could be practiced without the user having the ability to see the touch screen display at all, or in embodiments where the user can see the touch screen display, but (for whatever reason) prefers to receive feedback haptically instead of visually.

Some example embodiments may employ a certain touch gesture, which may be referred to as a pulse gesture, to indicate to the touch screen display that the user desires to receive feedback haptically with respect to information provided regarding a selectable item that is selected using the pulse gesture. The pulse gesture may be defined by the contact of at least two fingers with the touch screen display, where the fingers are held close to each other. The pulse gesture therefore simulates the manner in which one might check his/her own pulse or the pulse of another by placing two or more fingers close together on, for example, the carotid artery (neck) or the radial artery (wrist). Receipt of the pulse gesture may indicate to the touch screen display that the user wishes to receive haptic feedback regarding the item selected using the pulse gesture. Thus, rather than (or in addition to) providing visual feedback (or audible feedback), the touch screen display may provide haptic feedback to the user (e.g., via a tactile feedback device).

In some cases, the feedback may be provided haptically via vibrations or other tactile feedback that occurs at a controllable frequency. The haptic feedback may be provided to indicate an amount of activity associated with an application that is associated with the object or item that is selected using the pulse gesture. Thus, for example, the haptic feedback may be provided at a frequency that is proportional to the amount of activity (e.g., higher activity causes provision of a high frequency tactile response). In other examples, various items associated with an application may be ranked based on their activity and the haptic feedback may be provided in a manner or at a frequency that is indicative of rank (e.g., high frequency feedback may indicate a high rank, or a number of bursts of vibration may indicate a ranking order such that a top ranked item may receive one burst and the third ranked item may receive three successive bursts) rather than being proportional to an amount of activity.

In some examples, another gesture may be defined for exiting from the pulse gesture to further enable additional information to be retrieved in relation to a selected item. Such a gesture may be referred to as a pulse-exit gesture (e.g., a gesture to which a transition can be made from the pulse gesture). The pulse-exit gesture (or multiple different pulse-exit gestures) may be correlated to a specific type of further information that is desired to be pulled from the device via haptic feedback and/or audible feedback.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing sight independent activity reports responsive to a touch gesture are displayed. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
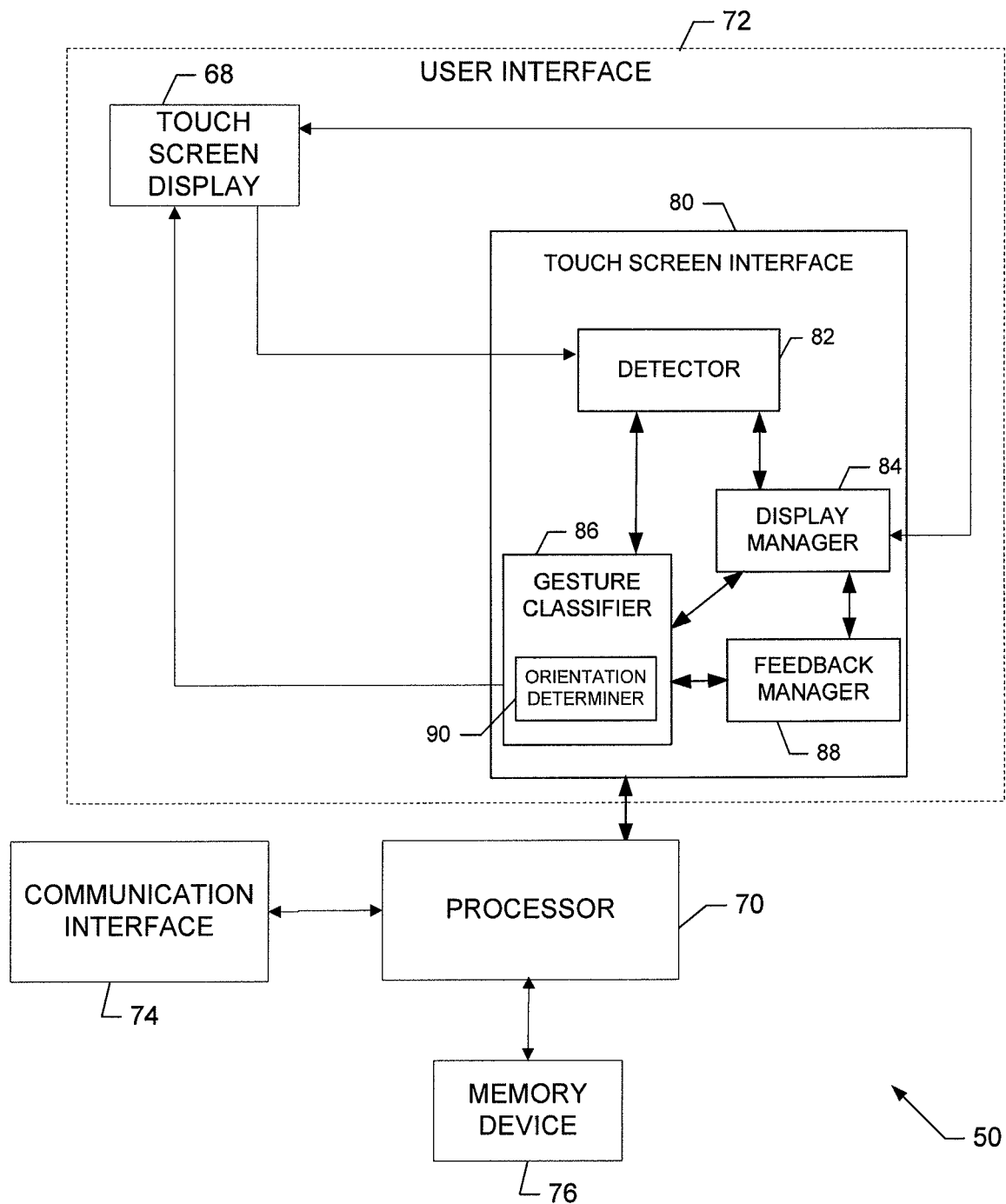
FIG. 2 is a schematic block diagram of an apparatus for providing sight independent activity reports responsive to a touch gesture according to an example embodiment of the present invention.

It should also be noted that while FIG. 2 illustrates one example of a configuration of an apparatus for providing sight independent activity reports responsive to a touch gesture, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing sight independent activity reports responsive to a touch gesture is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to cause provision of an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface 72 may be in communication with the touch screen display 68 to receive indications of user inputs at the touch screen display 68 and to modify a response to such indications based on corresponding user actions that may be inferred or otherwise determined responsive to the indications.

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, a gesture classifier 86 and a feedback manager 88. Each of the detector 82, the display manager 84, the gesture classifier 86 and the feedback manager 88 may be any device or means embodied in either hardware or a combination of hardware and software configured to perform the corresponding functions associated with the detector 82, the display manager 84, the gesture classifier 86 and the feedback manager 88, respectively, as described herein. In an exemplary embodiment, each of the detector 82, the display manager 84, the gesture classifier 86 and the feedback manager 88 may be controlled by or otherwise embodied as the processor 70.

The detector 82 may be in communication with the touch screen display 68 to receive indications of user inputs in order to recognize and/or determine a touch event based on each input received at the detector 82. A touch event may be defined as a detection of an object, such as a stylus, finger, pen, pencil, glove or any other pointing device, coming into contact with a portion of the touch screen display in a manner sufficient to register as a touch. In this regard, for example, a touch event could be a detection of pressure on the screen of the touch screen display 68 above a particular pressure threshold over a given area or the detection of a change in the electrostatic field of the touch screen display 68 at a particular location. As such, some touch events may not actually require physical contact with the touch screen display 68. For example, in some cases, the touch screen display 68 may be configured to detect one or more objects (e.g., a finger or fingers) hovering over the touch screen display 68. Gestures associated with the object or objects may also be detected in some cases, even without physical contact with the touch screen display 68. For example, in some cases, a touch event may be sensed through an article of clothing, fabric, flexible material, thin material, and/or the like. Subsequent to each touch event, the detector 82 may be further configured to pass along the data corresponding to the touch event (e.g., location of touch, length of touch, number of objects touching, touch pressure, speed of movement, direction of movement, length of delay, frequency of touch, etc.) to the gesture classifier 86 for gesture classification.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, swipe, pinch event (e.g., a pinch in or pinch out), a pulse gesture, a pulse-exit gesture and/or the like.

A touch may be defined as a touch event that impacts a single area (without or with minimal movement on the surface of the touch screen display 68) and then is removed. A multi-touch may be defined as multiple touch events sensed at the same time (or nearly the same time). A stroke event may be defined as a touch event followed immediately by motion of the object initiating the touch event while the object remains in contact with the touch screen display 68.

In other words, the stroke event may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

Figure 3:
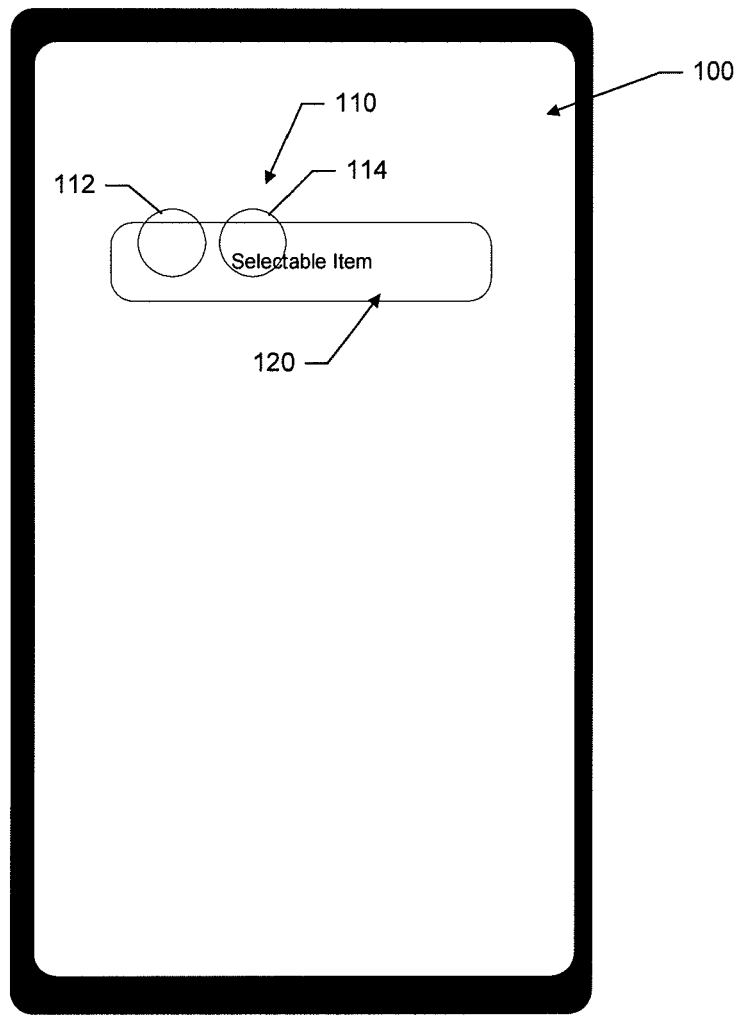
FIG. 3 illustrates a pulse gesture pattern detected at a touch screen display according to an example embodiment of the present invention.

A pulse gesture may be defined as a multi-touch event initiated with at least two fingers that are held close together. FIG. 3 illustrates a pulse gesture pattern detected at a touch screen display. As shown in FIG. 3, the touch screen display 100 may receive a pulse gesture 110 that is defined by a first finger touch 112 (e.g., initiated by an index finger) being proximate to a second finger touch 114 (e.g., initiated simultaneously with the middle finger). In some embodiments, a threshold distance may be defined such that the distance between the first finger touch 112 location and the second finger touch 114 location are within the threshold distance in order for the touch event to be recognized as a pulse gesture. Furthermore, the pulse gesture 110 may be recognized responsive to holding the first finger touch 112 and the second finger touch 114 next to each other for a predetermined minimum amount of time. When time and spatial criteria for pulse gesture classification are met, a series of touches may be recognized as the pulse gesture 110.

A pulse-exit gesture may be defined as a multi-touch event initiated immediately following a pulse gesture. The pulse-exit gesture may involve at least the same fingers used to employ the pulse gesture and may include movement of at least one of those fingers out of the pulse gesture position. For example, the pulse-exit gesture may include the performance of a swipe with one or both fingers used to perform a pulse gesture. In some embodiments, more than one pulse-exit gesture may be defined as being viable options for exiting from the pulse gesture. Of course, if the user simply lifts one or more fingers, the pulse gesture may be terminated at any time. However, if further or different feedback is desired beyond that which is offered by providing a pulse gesture, then the pulse-exit gesture may be provided in order to pull information associated with the corresponding further or different feedback. In cases where multiple pulse-exit gestures are possible, each respective pulse-exit gesture may have a corresponding feature or aspect of information related to the application with which the original pulse gesture was associated.

The pulse gesture 110 (or pulse-exit gesture) may be provided in relation to a selectable item 120 (or object). The selectable item 120 may be an icon or other user interface element that is associated with a particular application. Thus, for example, in some cases the selectable item 120 may be the icon that, when selected, launches the particular application. In other cases, the selectable item 120 may be an item that is representative of a particular function, content item, or descriptor that is associated with the particular application. Thus, for example, if the particular application is a phonebook, contact list, social networking or communication-related application, the selectable item 120 may represent one contact. If the particular application is a media player or gallery, the selectable item 120 may represent one content item. If the particular application is a web browser, the selectable item 120 may represent a link to a web page or blog.

Regardless of the specific item or object that the selectable object 120 represents, example embodiments may enable the presentation of haptic feedback via the feedback manager 88 to provide activity reports when the pulse gesture (or pulse-exit gesture) is provided to the selectable object 120. The activity reports may typically be the result of a status check associated with the application associated with the selectable object 120 being performed by the feedback manager 88. Thus, for example, when the pulse gesture 110 is recognized in relation to the selectable object 120, the feedback manager 88 may perform a status determination regarding the corresponding application (and in some cases specifically related to the selectable object 120). Then, based on the determined status, the feedback manager 88 may cause the provision of haptic feedback via the same fingers that initiated the pulse gesture 110. The haptic feedback provided by the feedback manager 88 may be determined based on a feedback lexicon that may define the feedback to be provided for various situations.

As such, the feedback manager 88 may be configured to perform a status determination for any application associated with a selectable item that receives a pulse gesture or pulse-exit gesture. Based on the status determined, the feedback manager 88 may consult the feedback lexicon to determine, for the status indicated for the application associated with the selectable item, and the pulse gesture or pulse-exit gesture received, the feedback that is to be provided. The feedback manager 88 may then provide instructions or signaling to the display manager 84 to initiate provision of the feedback that is to be provided. The feedback lexicon may include a mapping of various applications and the corresponding feedback to be given for respective different status indications for selectable items associated with the applications. The feedback lexicon may also include listings of the corresponding different pulse-exit gestures that may follow a pulse gesture and the corresponding status determinations and feedbacks associated with each pulse-exit gesture. In some embodiments, the feedback manager 88 may be configured to include default rules for the provision of feedback for applications that do not have specific definitions in the feedback lexicon.

In some embodiments, the feedback lexicon may be predetermined. Users may be enabled to view the feedback lexicon in order to learn what the feedback options are for each application, but the users may not alter the feedback lexicon. However, in other examples, the user may be enabled to modify or even create feedback lexicon entries for various different applications. In one example, each feedback lexicon entry may include an identification of the application, status and a corresponding feedback or rule for provision of feedback. The rule may indicate, for example, that the feedback is to be provided via tactile and/or audible vibrations provided at a predefined frequency. For example, in some cases, the frequency may be selected such that the frequency of the feedback is proportional to the frequency of occurrence of a particular activity associated with the application. Thus, for example, if a web page has had a high number of hits or degree of activity, a friend has been logged into a social network frequently or has sent a lot of messages, a blog has received a high number of postings, or a large number of missed calls have been received, a high frequency haptic feedback response may be provided. Various thresholds for activity may be defined for each respective level or frequency of haptic feedback to be provided in response.

Alternatively, the rule may indicate that the feedback is to be provided at a frequency of pulses that is determined based on a ranking of the selectable item with respect to frequency of occurrence of an activity common to other selectable items associated with the application. Thus, for example, if a selected contact among a group of contacts has been the most active among all of the contacts, then that contact may provide a high frequency haptic feedback response when the corresponding contact is selected with a pulse gesture. In these examples, there may be no need to define levels or thresholds corresponding to each frequency band or type of haptic feedback response. Instead, the items associated with a particular application are ranked against one another and the feedback is provided with respect to the ranking and without regard to any particular threshold amount of activity. The feedback need not necessarily only based on frequency of vibration, however. For example, in some cases the length, duration, strength, volume, or other characteristics of the tactile response and/or audible response may be used to provide various distinct feedback responses. Other characteristics, such as movement of vibration across the touch screen display, patterns of movement, screen temperature changes and the like may also provide distinct responses and, in some cases, may have corresponding unique meanings according to the feedback lexicon. Moreover, in some cases, the feedback mechanism may be changeable based on certain environmental or user selected context parameters. For example, if the user indicates that sound is not to be provided, the feedback may be provided only via tactile vibration. However, the user may also select to receive feedback via tactile vibration along with an audible response (e.g., a tone or series of tones, beep, or even synthetic or recorded speech). In some cases, when the device detects a pulse gesture being input through an article of clothing or other material, the feedback may be additionally or alternatively provided audibly in case the article of clothing or material may inhibit receipt of a tactile only response.

In still other cases, the rule may define a code or even a vocabulary that provides specific information regarding a particular application. For example, for a certain application (e.g., a mapping application, calendar, etc.), providing a pulse gesture (or pulse-exit gesture) may form a query as to status with respect to achievement of a goal, commencement of a next activity or completion of a task. In a mapping application example, the pulse gesture may be initiated to solicit haptic feedback as to the distance or time remaining until a next turn or until a destination is reached. Using pulse-exit gestures or even multiple repeated pulse gestures, multiple pieces of information may be retrieved. For example, in some cases, the pulse gesture may be used to request feedback regarding distance or time to the next turn and a pulse-exit gesture may be used to further request feedback regarding time or distance, or the number of turns remaining before the destination is reached. The feedback lexicon may define a code for indicating a number of vibration bursts that provides the number of minutes, miles or kilometers associated with the current status.

In an example embodiment, the gesture classifier 86 may be configured to communicate detection information regarding the recognition, detection and/or classification of a touch event to the display manager 84 and the feedback manager 88. The feedback manager 88 may identify the corresponding feedback to be provided and indicate the same to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display. However, in response to a pulse gesture (or a pulse-exit gesture), the display manager 84 may be configured to provide haptic feedback through the touch screen display 68. Thus, for example, the display manager 84 may include or otherwise control a tactile feedback device that may generate vibrations that can be felt through the touch screen display 68.

In an example embodiment, the display manager 84 may be configured to interface with the feedback manager 88 in response to a determination (e.g., by the gesture classifier 86) that a pulse gesture has occurred, to generate haptic feedback as directed by the feedback manager 88. After the pulse gesture is recognized, the display manager 84 may transition from making visual feedback responses to touch events, to making haptic feedback in addition to or instead of visual feedback responses. The provision of haptic feedback may apply to responses to the pulse gesture and any pulse-exit gesture detected after a pulse gesture. Once the pulse gesture is terminated (other than by a pulse-exit gesture) or the pulse-exit gesture is terminated or completed, the display manager 84 may revert to the provision of feedback responses via visual manipulations of the touch screen display 68.

In some example embodiments, when classifying a pulse-exit gesture, the gesture classifier 86 may be configured to determine an orientation of the touch screen display 68 in order to be able to determine which direction the at least two fingers move when transitioning from the pulse gesture to the pulse-exit gesture. Accordingly, the gesture classifier 86 may employ an orientation determiner 90. The orientation determiner 90 may be any device that is capable of determining orientation information (e.g., electronic compass, a horizon sensor, gravity sensor, accelerometer, gyroscope, magnetometer and/or the like or any other sensor that may be useful in determining orientation information). By knowing the orientation of the device, when a pulse-exit gesture is performed, the gesture classifier 86 may be enabled to determine a specific direction related classification of the pulse-exit gesture. Thus, for example, a pulse exit gesture that moves right, left, up or down on the touch screen display 68 may be differently classified and recognized so that corresponding different rules for feedback provision may be assigned to each respective pulse-exit gesture that is recognized. As such, the ability to determine specific characteristics of a pulse-exit gesture in relation to the orientation of the device via the gesture classifiers ability to employ the orientation determiner 90 provides the feedback manager 88 with the ability to define a relatively robust feedback lexicon to generate relatively robust feedback provision functionality for sight independent feedback initiated by touch gestures. The ability to recognize the direction associated with movement involved in a pulse-exit gesture also ensures that the relative direction of the pulse-exit gesture may be interpreted consistently regardless of the way the device is positioned (e.g., in a pocket or in another place out of view).

Some example embodiments will now be described in reference to FIGS. 4-11. However, it should be appreciated that these examples are not limiting examples. Rather, these examples merely illustrate how the pulse gesture and/or the pulse-exit gesture may be employed in connection with some example applications and situations.

Figure 4:
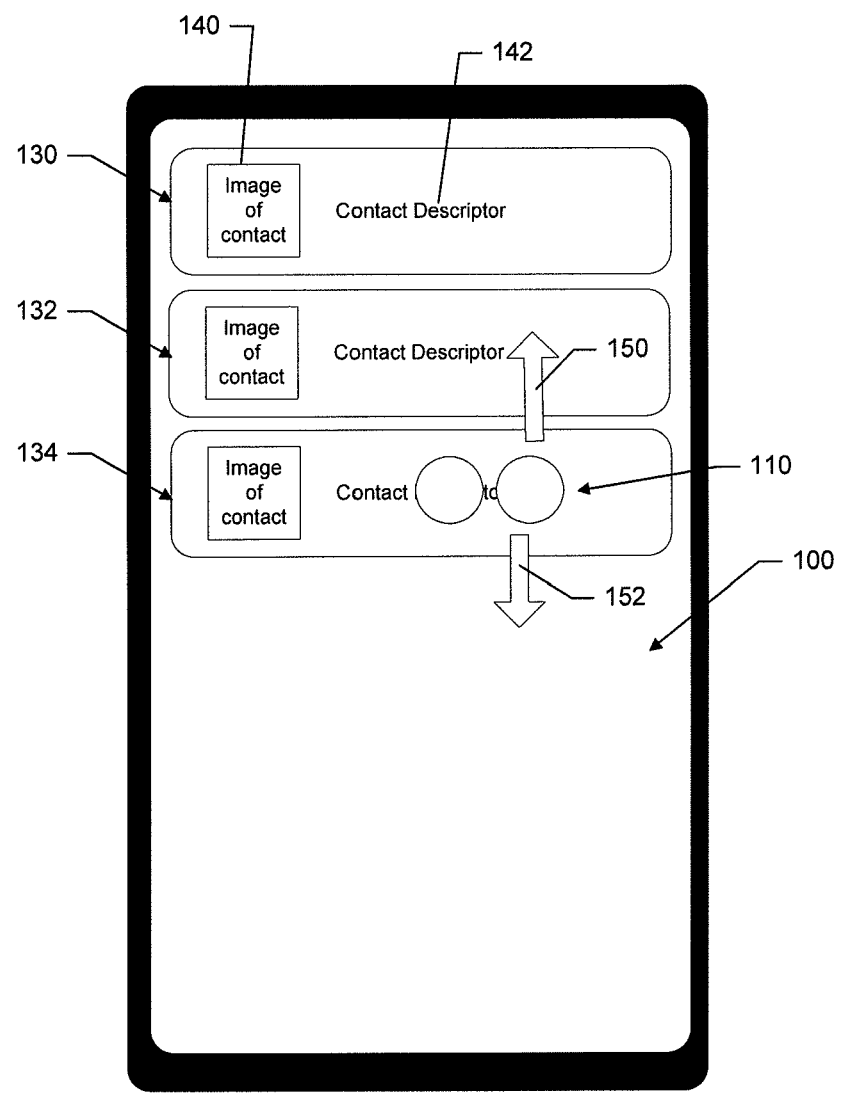
FIG. 4 illustrates an example of a series of contacts displayed on the touch screen display that may be displaying content associated with friends in a social network, contacts from an address book, and/or the like according to an example embodiment of the present invention.
Figure 5:
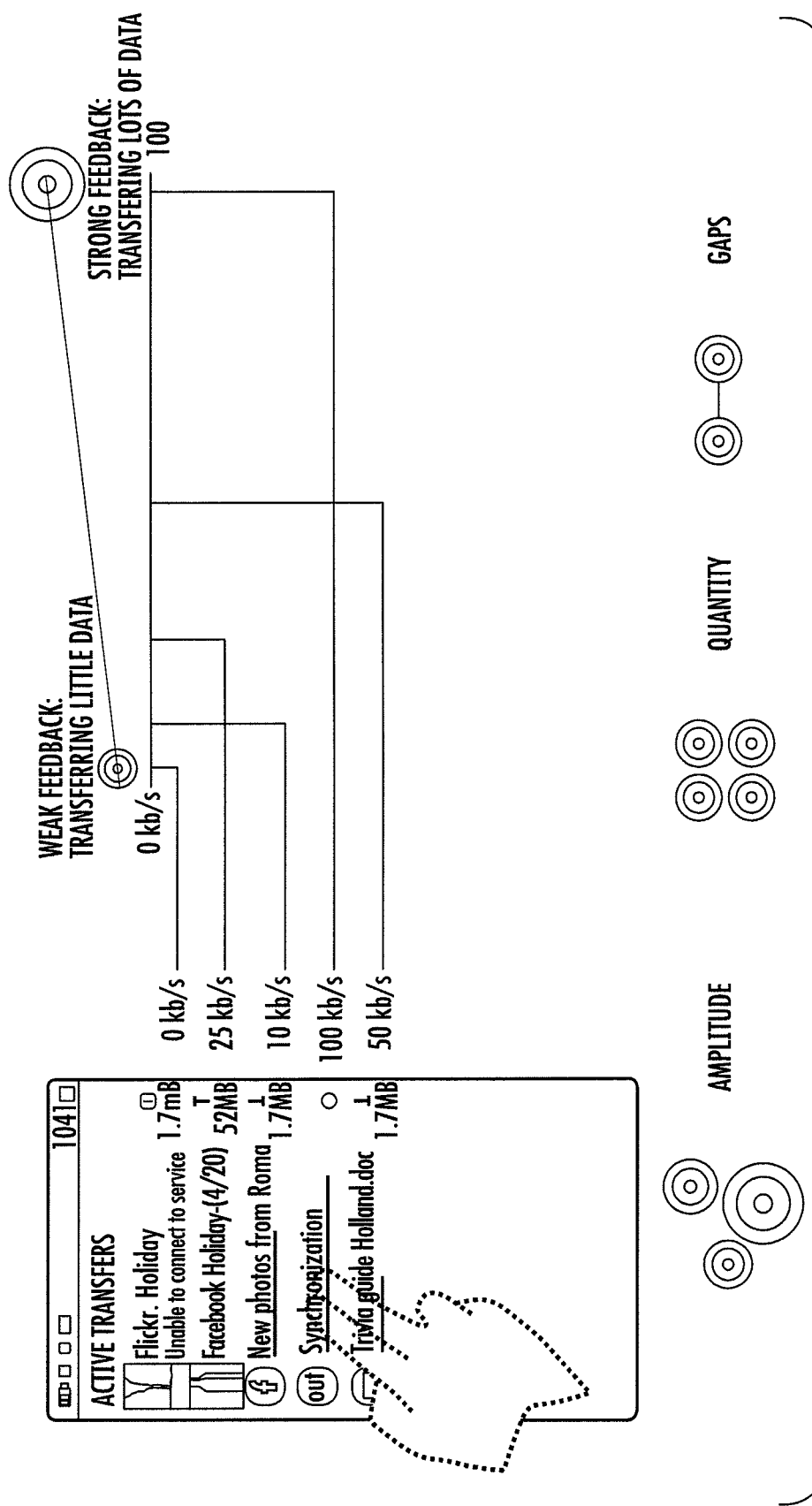
FIG. 5 illustrates an example haptic vocabulary that may be provided using the feedback lexicon according to an example embodiment of the present invention.

In this regard, FIG. 4 illustrates an example of a series of contacts displayed on the touch screen display 100 that may be displaying content associated with friends in a social network, contacts from an address book, and/or the like. In this example, there are three contacts displayed (e.g., first contact 130, second contact 132 and third contact 134). Each contact may have a representative image 140 and a corresponding contact descriptor 142 (e.g., a name, alias, handle, etc.). The pulse gesture 110 may be received relative to the third contact 134 as shown in FIG. 4. In response to the pulse gesture 110, the feedback lexicon for this application may indicate that a status of the third contact 134 is to be determined and feedback indicative of the status is to be provided by haptic feedback. The status may be, for example, indicative of the activity of the third contact 134 relative to any particular activity (calling, sending messages, posting comments, updating status, having a particular status, logging in, etc.) associated with the application. The feedback lexicon may define the activity that is to be indicated along with the manner in which the feedback is to be provided. Thus, for example, the feedback lexicon may also define a reporting paradigm for indicating the activity. The reporting paradigm may indicate, for example, whether the frequency of activity, speed of activity, quality of an activity, number of instances of an activity and/or the like are to be represented numerically (e.g., by a burst indicating relative position in a ranking, or by a burst indicating the number of instances) or by a frequency of vibration that is proportional to the frequency, speed or quality, or is indicative of the rank or the activity relative to other items in the same category. FIG. 5 illustrates an example haptic vocabulary that may be provided using the feedback lexicon. As shown in FIG. 5, a meaningful vocabulary may be defined such that feedback vibra strength is proportional to download speed. Other vocabularies may also be established.

If the user employs a pulse-exit gesture by moving the fingers forming the pulse gesture 110 in the direction shown by arrows 150 and 152, the pulse-exit gesture may be classified accordingly and a feedback rule defined for the corresponding pulse-exit gesture may be followed to provide haptic feedback accordingly.

Figure 6:
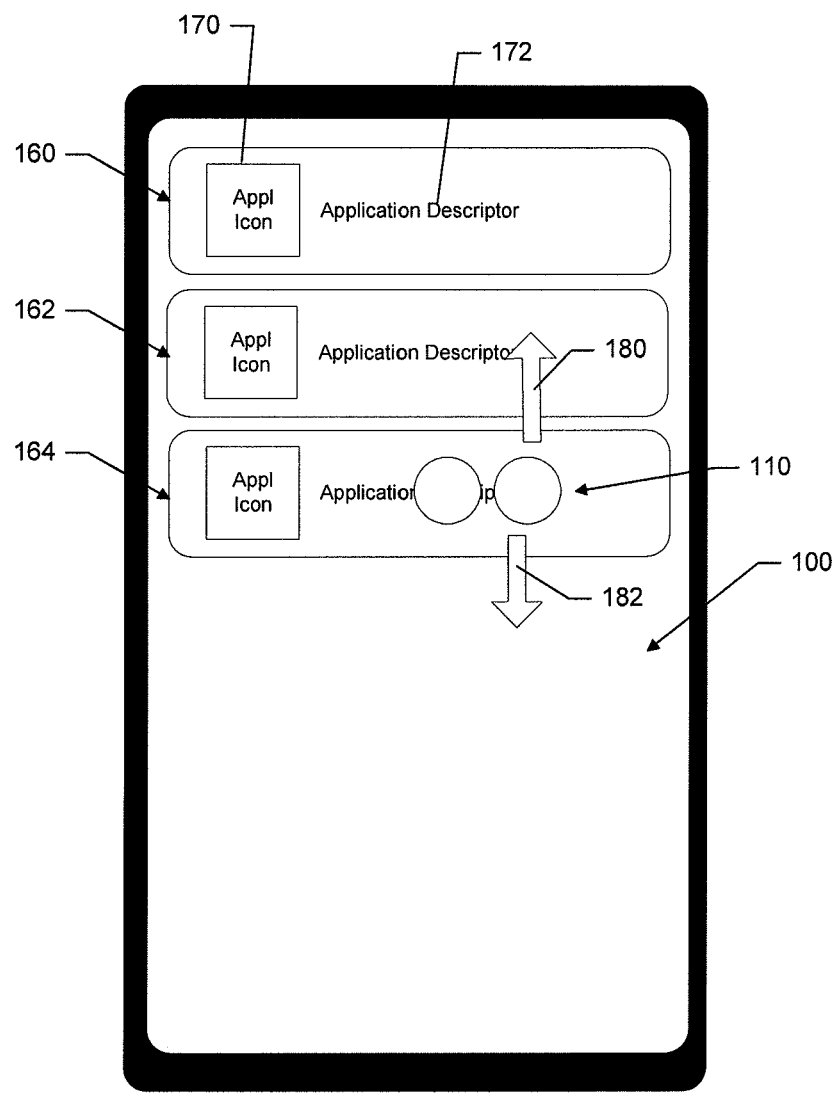
FIG. 6 illustrates an example of a series of selectable items that are each icons associated with different applications displayed on the touch screen display according to an example embodiment of the present invention.

FIG. 6 illustrates an example of a series of selectable items that are each icons associated with different applications displayed on the touch screen display 100. In this example, there are three icons displayed (e.g., first icon 160, second icon 162 and third icon 164). Each icon may have a representative image 170 and a corresponding application descriptor 172 (e.g., a name, function, etc.). The pulse gesture 110 may be received relative to the third icon 164 as shown in FIG. 6. In response to the pulse gesture 110, the feedback lexicon for the corresponding application may indicate that a status of the application associated with the third icon 134 is to be determined and feedback indicative of the status is to be provided by haptic feedback. The status may be, for example, indicative of the activity of the application associated with the third icon 164 relative to any particular activity (data downloading, number or frequency of blog postings, number or frequency of log ins, number or frequency of updates, most recent log in, number of new content items, new messages received, missed calls, etc.).

The feedback lexicon may define the activity that is to be indicated along with the manner in which the feedback is to be provided. Thus, for example, the feedback lexicon may also define a reporting paradigm for indicating the activity as described above. For example, if the downloading speed for an active transmission occurring in association with one of the applications is high (e.g., above corresponding threshold), then a high frequency tactile feedback may be provided to the user in response to the pulse gesture 110. Different thresholds or activity ranges may be defined for each respective range of feedback frequencies to be provided. Alternatively, regardless of the actual speed, if the download speed is the highest of any active transfer currently in progress, the high frequency tactile feedback may be provided. In other words, a ranking system may be employed and the frequency may be indicative of rank (e.g., high frequency for a high rank). However, a series of bursts of any frequency may alternatively be used to indicate ranking with the number of bursts indicating the numerical ranking.

If the user employs a pulse-exit gesture by moving the fingers forming the pulse gesture 110 in the direction shown by arrows 180 and 182, the pulse-exit gesture may be classified accordingly and a feedback rule defined for the corresponding pulse-exit gesture may be followed to provide haptic feedback accordingly. For example, if the pulse gesture causes a report on download speed, the pulse-exit gesture corresponding to arrow 180 may cause a report on estimated time remaining on the download and the pulse-exit gesture corresponding to arrow 182 may cause a report on a different activity such as, for example, how long the download has been in progress.

Figure 7:
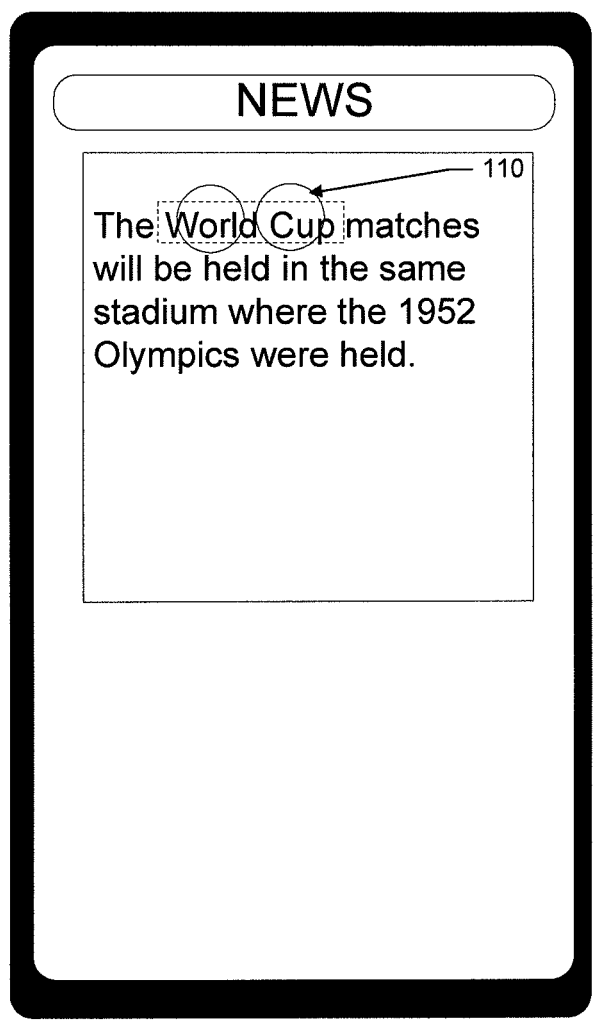
FIG. 7 illustrates an example of an embodiment in which certain words from a text selection may be treated as selectable items according to an example embodiment of the present invention.

FIG. 7 illustrates an example of an embodiment in which certain words (e.g., key words or phrases) from a text selection may be treated as selectable items. In this example, the phrase "World Cup" may be selected with the pulse gesture 110 in order to check the frequency of searches or posts relating to the corresponding topic in relation to online news sources, search engines or blogs. A pulse-exit gesture may further indicate additional information associated with the topic.

Figure 8:
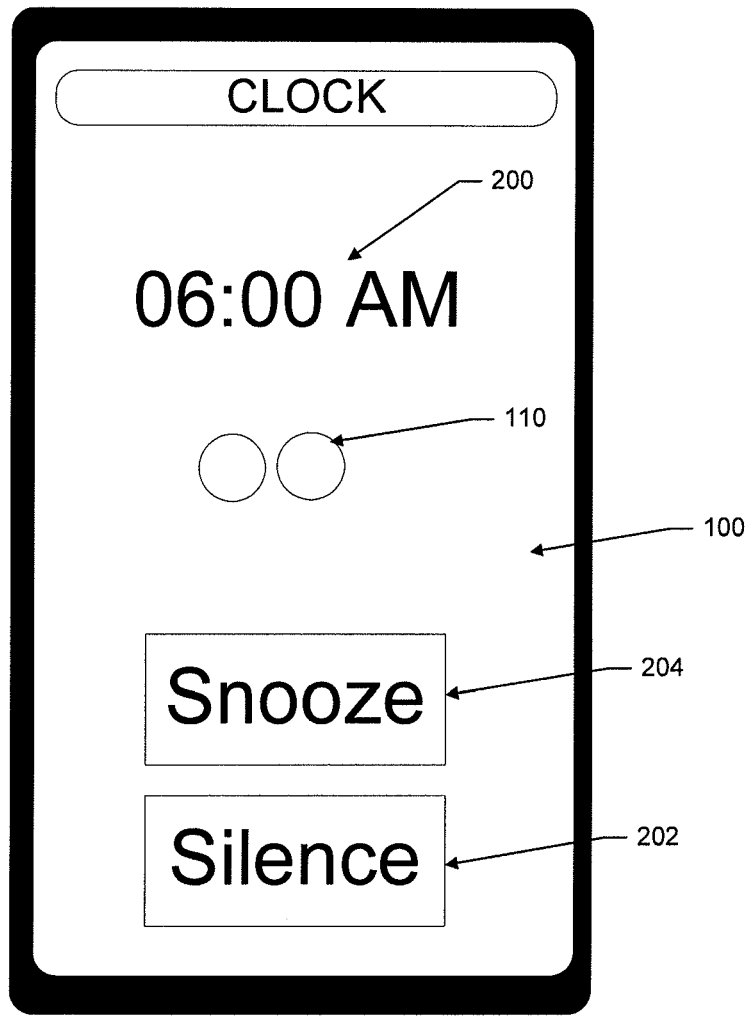
FIG. 8 illustrates an example embodiment employed in connection with a clock application according to an example embodiment of the present invention.

FIG. 8 illustrates an example embodiment employed in connection with a clock application. In the example of FIG. 8, an alarm may be set for the clock and the alarm may go off at a set time (e.g., 6:00 AM). The touch screen display 100 may display an indication of the time 200. In response to the time reaching the time set for alarm activation, the alarm may sound. The touch screen display 100 may typically display graphical user interface (GUI) elements that when selected will allow the user to silence the alarm (e.g., via stop button 202) or initiate a snooze (e.g., via snooze button 204). However, when awaking, it may be difficult for the user to determine where these GUI elements are located and the user may have difficulty silencing the alarm or initiating a snooze. To avoid this difficulty, example embodiments may enable sightless interaction with the clock application.

In this regard, an example embodiment may enable the user to check time, silence the alarm, and/or initiate a snooze function (once or multiple times) without requiring the user to see the touch screen display 100 or interact with any GUI elements displayed thereon. In this regard, for example, after the alarm has sounded, the use of a two finger pulse gesture 110 may cause a snooze. Notably, the pulse gesture 110 may be provided anywhere on the touch screen display 100 and thus, the user does not need to visually locate the snooze button 204 to ensure contact with the snooze button 204 in order to initiate the snooze functionality. The use of three or more fingers may silence the alarm. Meanwhile, two or three successive instances of the pulse gesture (e.g., with two fingers) may initiate a double or triple snooze, respectively. As yet another alternative, the use of a two finger pulse gesture to initiate a snooze followed by an up or down pulse-exit gesture may initiate a double or triple snooze, respectively, as defined in the feedback lexicon. In each case, the user may receive a vibratory confirmation that generically indicates receipt of the command, or provides a unique confirmation of the additional time added to the snooze function. For example, a single vibra buzz may indicate a five minute snooze, while a double vibra buzz may indicate a ten minute snooze and a triple vibra buzz may indicate a 15 minute snooze.

Figure 9:
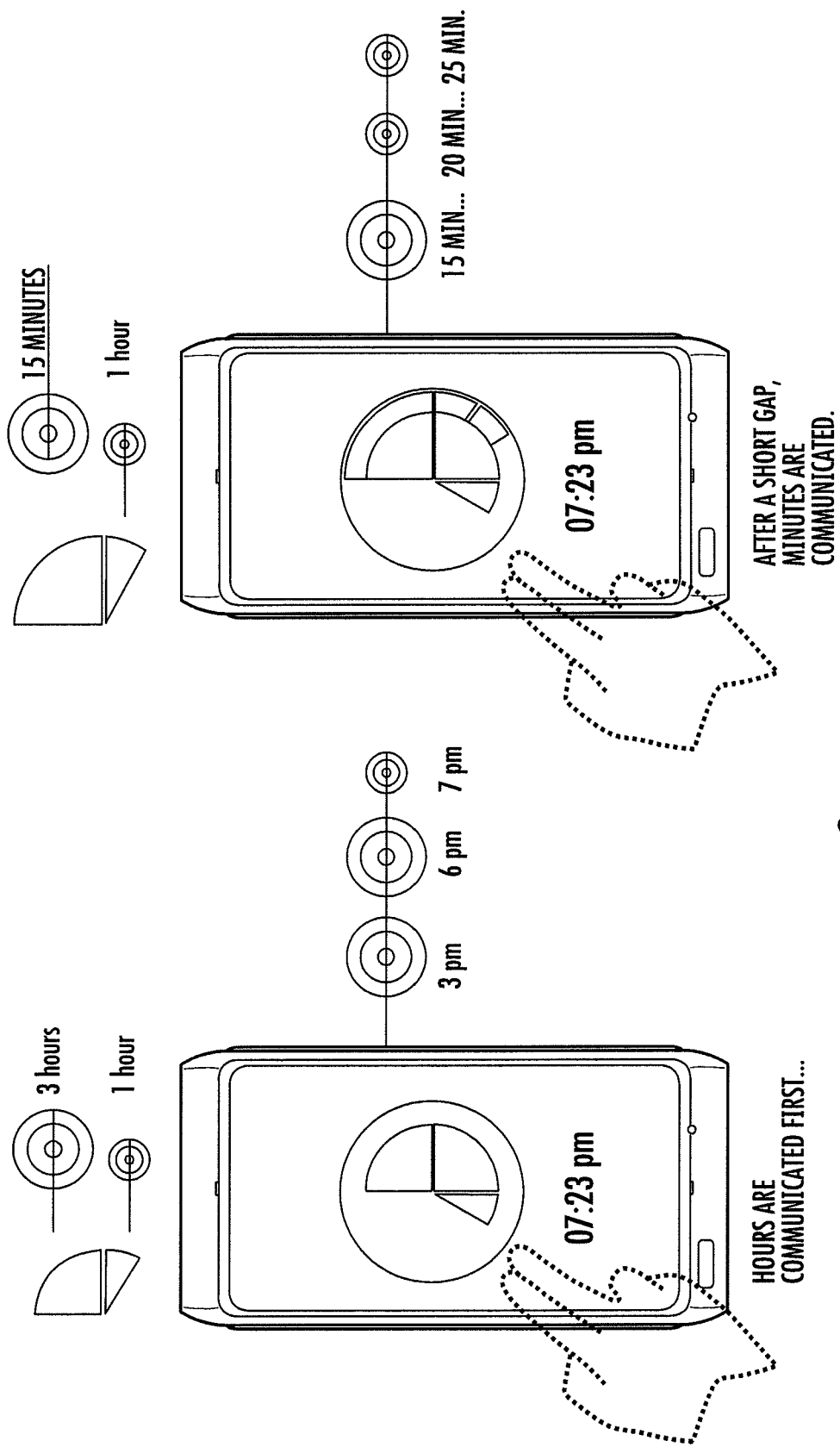
FIG. 9 illustrates an example of visual animation being presented to teach the user the vocabulary used for the clock application according to an example embodiment of the present invention.

Apart from alarm conditions, the clock application may be interacted with in a sightless fashion to determine time as well. For example, a pulse gesture may be used in connection with the clock application in order to inquire as to the current time or the time remaining until the alarm sounds, and the response may be provided using a vibration code that indicates the current time or time remaining, respectively. As an example, a long buzz may represent a quarter of the clock face (e.g., 3 hours or 15 minutes dependent upon whether hours or minutes are being communicated). Thus, two long buzzes may indicate 6 hours. Short buzzes may indicate 1/12 of the clock face (e.g., 1 hour or 5 minutes dependent upon whether hours or minutes are being communicated). Thus, the user may be enabled to inquire as to the current time and receive a series of buzzes in an hours first and then minutes format (e.g., where the accuracy of the clock can be indicated to an accuracy of the nearest 5 minutes). There may be a pause inserted between hours and minutes to enable the user to distinguish transference from hours to minutes. However, the user may remove the his/her hand from the display after the hours portion of the time is communicated in order to only receive approximate time (e.g., what hour it is). In some embodiments, the display may be used to present visual animations to teach the user the vocabulary used to for telling time on the clock via blind-use or sight independent use. FIG. 9 illustrates an example of visual animation being presented to teach the user the vocabulary used for the clock.

Other example embodiments are also possible. For example, the pulse gesture may be used in connection with a media player application (e.g., music, video, and/or the like). If a song or video is being played, the user may initiate a pulse gesture to receive feedback on the time remaining, number of chapters or songs remaining, and/or the like. Moreover, since the pulse gesture may trigger feedback and provide a mechanism for receiving the feedback in a manner that does not rely on sight, the device could be in the user's pocket and the user could still solicit and receive the corresponding feedback. In some instances, the user may be enabled to provide the pulse gesture and receive feedback through an article of clothing (e.g., a pants pocket or the like). Furthermore, in some example embodiments, further and different information may be retrieved by initiating a pulse-exit gesture. As indicated above, the feedback to be provided for the pulse gesture and each of any number of possible pulse-exit gestures may be predetermined based on the feedback lexicon. However, in some cases, rather than simply requesting feedback, some functionality may be provided by instituting the pulse-exit gesture. For example, using one pulse-exit gesture, the user may skip to the next song or chapter, while the user may stop or pause play by using a different pulse-exit gesture. Similarly, when the user uses the pulse gesture to retrieve information on the number of missed calls or messages received, the user may employ a particular pulse-exit gesture to read out (e.g., via text-to-speech conversion), the names of the callers, or read out or play the messages left.

Figure 10:
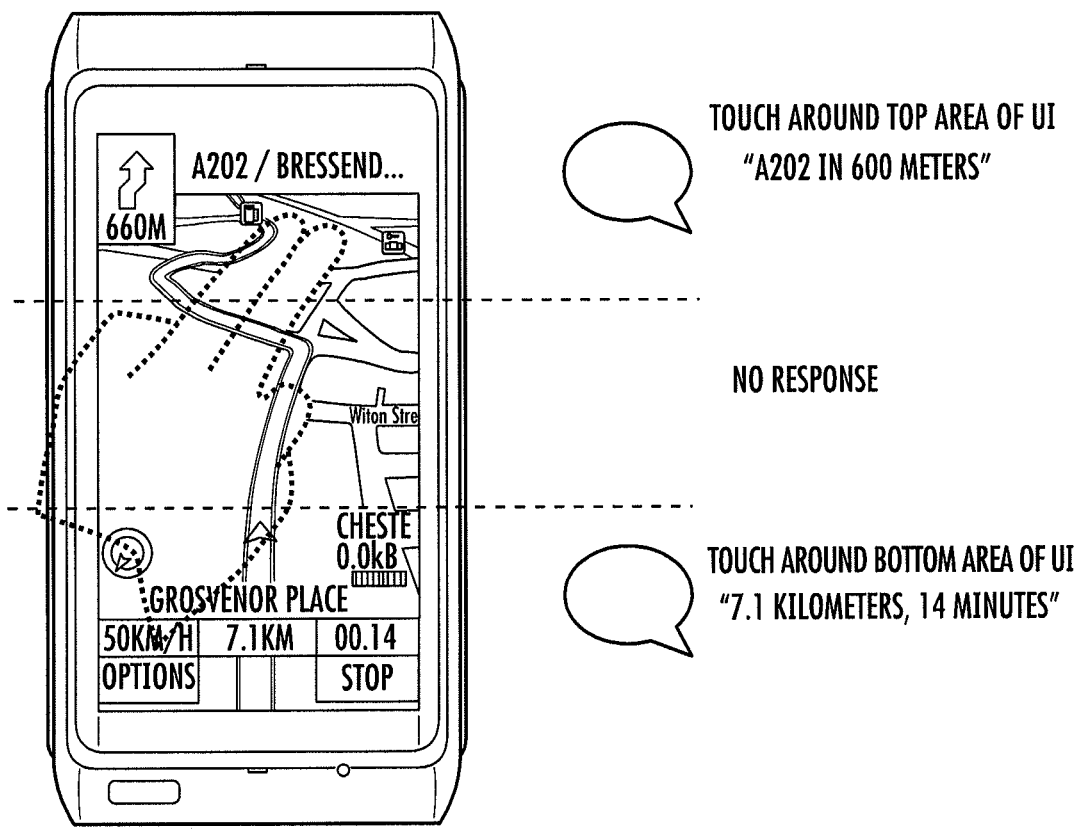
FIG. 10 illustrates an example embodiment employed in the context of a mapping application according to an example embodiment of the present invention.

FIG. 10 illustrates an example embodiment employed in the context of a mapping application. As indicated above, the use of a pulse gesture may cause generation of tactile feedback indicating a number of turns remaining to the destination, the time or distance remaining to the destination, or the time or distance remaining until the next turn. However, in some examples, the user may be further enabled to pull additional information from the mapping application. For example, in some cases, the user may pull voice information from the mapping application responsive to a pulse gesture or a pulse-exit gesture. The voice information may be a verbal repeat of the information that may be otherwise obtainable through tactile feedback. However, some embodiments may enable the user to skip tactile feedback entirely and directly request verbal feedback. For example, if the user selects an approximate area of the screen (e.g., for a map or other application) where the user remembers (or determines with a quick glance) that information is being displayed, the information may be pulled via voice feedback based on the user's gesture as shown in FIG. 10.

Figure 11:
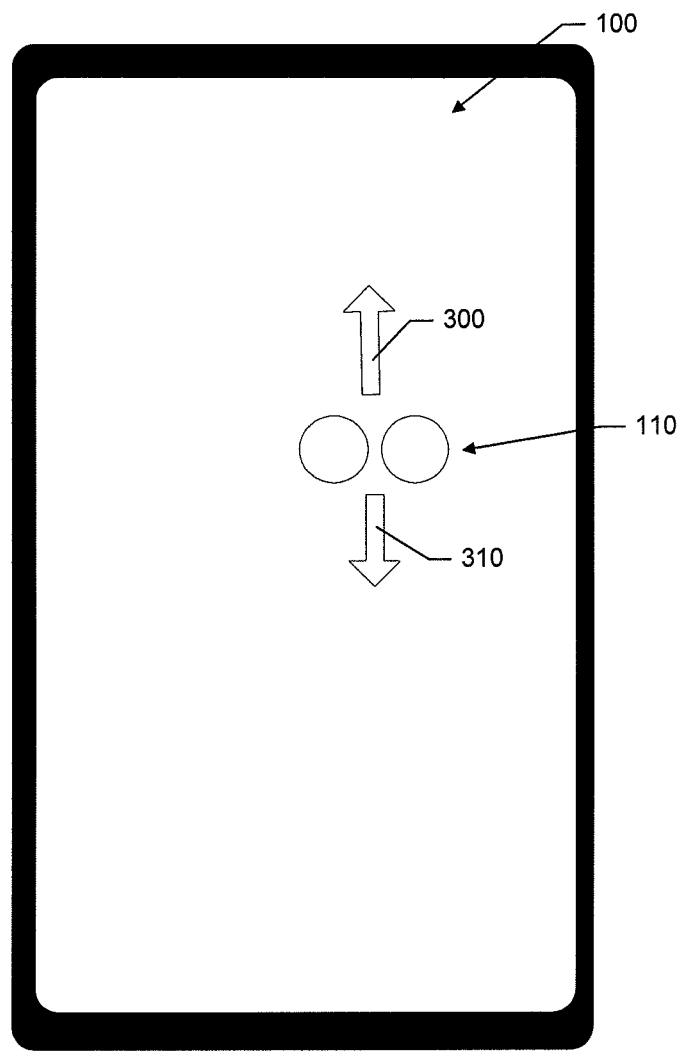
FIG. 11 illustrates an example in which a contact list or favorite contacts application may be open and a pulse gesture is provided according to an example embodiment of the present invention.

Although examples in FIGS. 3, 4, 6 and 7 illustrate the selectable items as being discrete items, sight independent operation may, in some cases be facilitated by elimination of any dependence on correspondence between the pulse gesture (or pulse-exit gesture) and a particular displayed object. Thus, in some cases, the selectable item may merely be any active portion of the display, as shown in the example of FIGS. 8 and 9, or a general region of the display, as shown in FIG. 10, for any particular application. For example, if a locked screen is displayed (or the device if in a locked state and the display is off) and a portion (or even all) of the locked screen is active when the idle screen is displayed (or when the display is off in the locked state), the pulse gesture may be provided at the active portion of the screen and the active portion (even if it is the entire screen) may act as the selectable item. However, in some situations, devices may also have other touch sensitive surfaces where the pulse gesture or other touch inputs may be employed (e.g., capacitive backplate, side edges or other portions of the device). Moreover, in some examples, a function associated with one application may be executed in response to performance of the pulse gesture, and other functions may be executed in response to performance of one or more directionally distinct pulse-exit gestures. FIG. 11 illustrates an example in which a contact list or favorite contacts application may be open and a pulse gesture 110 is provided. As shown in FIG. 11, the pulse gesture 110 can be provided anywhere on the touch screen display 100. In response to the pulse gesture 110, feedback may be provided regarding activity associated with the favorite contacts application. In this example, the feedback provided in response to the pulse gesture 110 may be an indication of a number of missed calls (e.g., as indicated by a number of buzzes generated). Other information may be provided in response to execution of a pulse-exit gesture. For example, in response to a determination of device orientation and a pulse-exit gesture toward a top of the device as indicated by arrow 300, an indication of the number of unread messages may be provided. Meanwhile, in response to an indication of a pulse-exit gesture in a direction toward the bottom of the device as indicated by arrow 310, an indication of the status of updates may be provided. The status may be provided relative to a benchmark or threshold as being greater than the threshold (e.g., long buzz), or less than the threshold (e.g., short buzz), or a direct indication of the number of updates may be provided.

Example embodiments may therefore enable a user to interact with a device (e.g., mobile terminal 10) without reliance on sight. The gesture requesting haptic feedback may be entered via the same object (e.g., at least two fingers) that receives the haptic feedback. Thus, for some example embodiments, the same objects and the same mode of interface is used for both input and response. Moreover, in some examples, repetitive insertion of the pulse gesture may shift to a different application in order to enable retrieval of information related to multiple applications using only touch inputs and tactile feedback.

Figure 12:
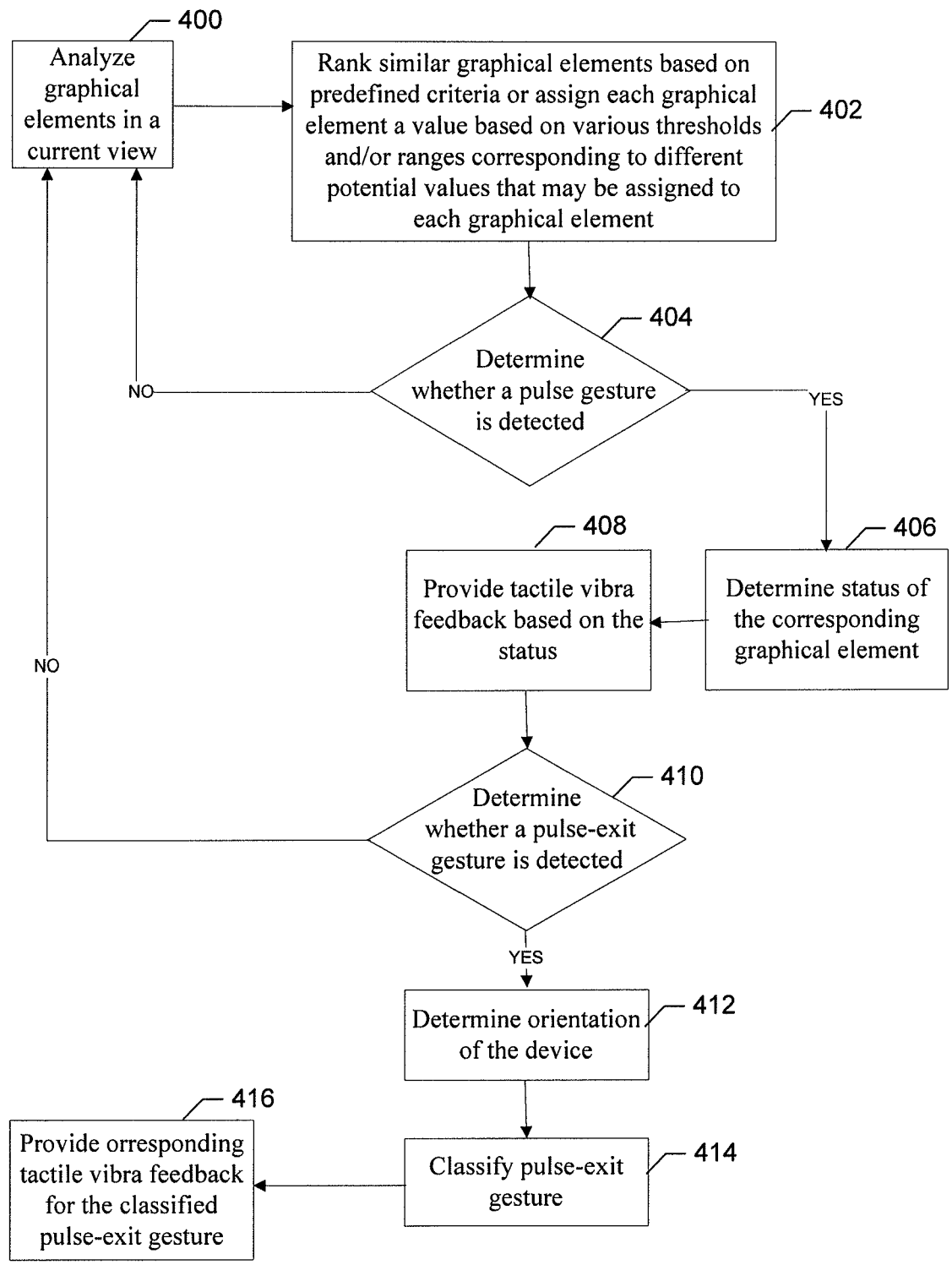
FIG. 12 illustrates a flowchart of work flow that may be handled according to an example embodiment of the present invention.

FIG. 12 illustrates a flowchart of work flow that may be handled according to an example embodiment. At operation 400, graphical elements in a current view may be analyzed. At operation 402, similar graphical elements may be ranked based on predefined criteria or a value such as an amplitude or other indicator of degree or frequency of occurrence of an event based on various thresholds and/or ranges corresponding to different potential values that may be assigned to each graphical element. At operation 404, a determination may be made as to whether a pulse gesture is detected. If the pulse gesture is detected, a status of the corresponding graphical element may be determined at operation 406 (e.g., the corresponding rank or value), and tactile vibra feedback may be provided based on the status at operation 408. A determination may then be made as to whether a pulse-exit gesture is detected at operation 410. If the pulse-exit gesture is detected, then a determination may be made as to the orientation of the device at operation 412. The pulse-exit gesture may then be classified at operation 414 and the corresponding tactile vibra feedback may be provided for the classified pulse-exit gesture at operation 416.

Figure 13:
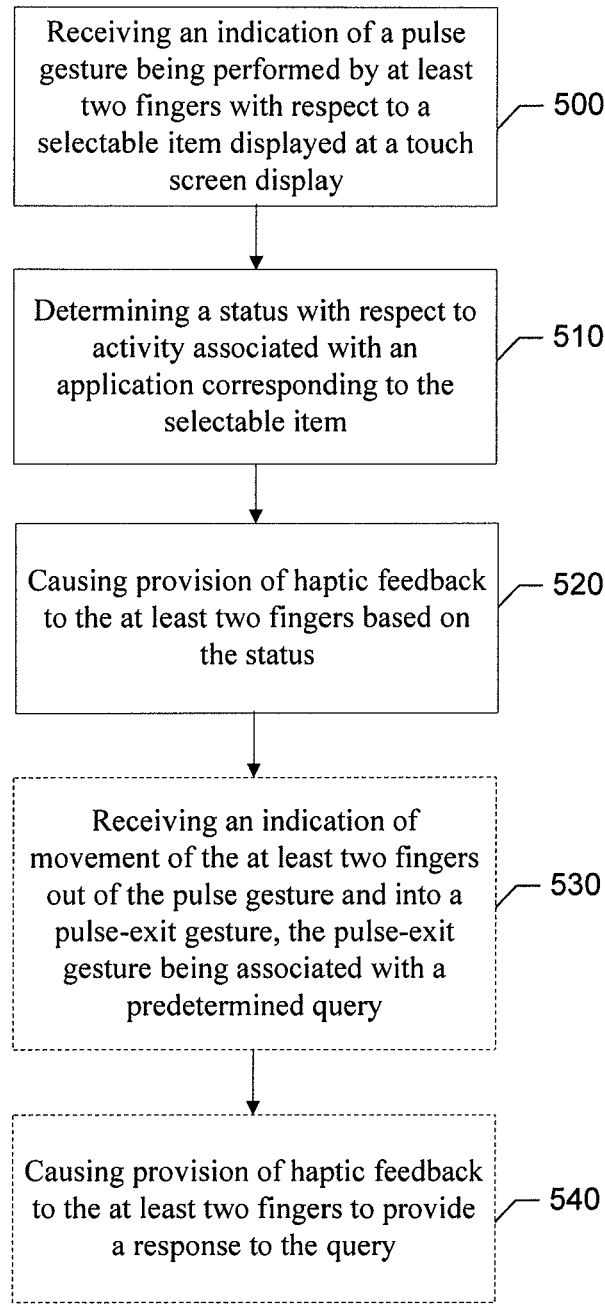
FIG. 13 is a block diagram according to an example method for providing sight independent activity reports responsive to a touch gesture according to an example embodiment of the present invention.

FIG. 13 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 13, may include receiving an indication of a pulse gesture being performed by at least two fingers with respect to a selectable item displayed at a touch screen display at operation 500, determining a status with respect to activity associated with an application corresponding to the selectable item at operation 510, and causing provision of haptic feedback to the at least two fingers based on the status at operation 520.

In some embodiments, certain ones of the operations above may be modified or further amplified as described below. Moreover, in some embodiments additional optional operations may also be included (some examples of which are shown in dashed lines in FIG. 13). It should be appreciated that each of the modifications, optional additions or amplifications below may be included with the operations above either alone or in combination with any others among the features described herein. In some embodiments, the method may further include receiving an indication of movement of the at least two fingers out of the pulse gesture and into a pulse-exit gesture where the pulse-exit gesture is associated with a predetermined query at operation 530, and causing provision of haptic feedback to the at least two fingers to provide a response to the query at operation 540. In some embodiments, receiving the indication of movement of the at least two fingers out of the pulse gesture and into the pulse-exit gesture may include determining a direction of movement of the at least two fingers and determining a respective query associated with the direction of movement of the at least two fingers, and causing provision of the haptic feedback may include causing provision of the haptic feedback to provide a response to the respective query. In an example embodiment, causing provision of the haptic feedback may include causing provision of a frequency of pulses to the at least two fingers that is proportional to a frequency of activity associated with the application. In some cases, causing provision of the haptic feedback may include causing provision of a frequency of pulses to the at least two fingers that is determined based on a ranking of the selectable item with respect to frequency of occurrence of an activity common to other selectable items associated with the application. In an example embodiment, the selectable item may be a specific portion of the touch screen display associated with a corresponding specific content item, a specific content item itself, or any portion of the touch screen display associated with the application. In some embodiments, determining the status with respect to activity associated with the application may include determining a status with respect to achieving a goal, completing a task, a frequency of performing an operation, a number of instances of performing an operation, arriving at a destination, receiving updates, participating in an activity, and/or the like. In an example embodiment, causing provision of the haptic feedback may include referencing a feedback lexicon defining a feedback response to be provided for the status determined for the application and directing the feedback response to be applied via the touch screen display.

In an example embodiment, an apparatus for performing the method of FIG. 13 above may comprise a processor (e.g., the processor 70) configured to perform some or each of the operations (500-540) described above. The processor 70 may, for example, be configured to perform the operations (500-540) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 500-540 may comprise, for example, the touch screen interface 80 (or respective different components thereof). Additionally or alternatively, at least by virtue of the fact that the processor 70 may be configured to control or even be embodied as the touch screen interface 80, the processor 70 and/or a device or circuitry for executing instructions or executing an algorithm for processing information as described above may also form example means for performing operations 500-540.

An example of an apparatus according to an example embodiment may include at least one processor and at least one memory including computer program code. The at least one memory and the computer program code may be configured to, with the at least one processor, cause the apparatus to perform the operations 500-540 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 500-540 (with or without the modifications and amplifications described above in any combination).

In some cases, the operations (500-540) described above, along with any of the modifications may be implemented in a method that involves facilitating access to at least one interface to allow access to at least one service via at least one network. In such cases, the at least one service may be said to perform at least operations 500 to 540.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving an indication of a gesture;
determining a status with respect to an application in response to receipt of the indication of the gesture, wherein the application comprises a clock application; and
causing provision of haptic feedback that provides information relating to the status that was determined with respect to the application, wherein causing provision of haptic feedback comprises causing provision of haptic feedback having one or more characteristics that are indicative of the status determined with respect to the application, wherein a temporal characteristic of the haptic feedback is indicative of a numerical property of the status determined with respect to the application, wherein the gesture is performed by at least two fingers, and comprises a touch gesture with at least two fingers touching a display from initiation of the gesture until recognition of the gesture.

2. The method of claim 1, wherein the status is a time indicated by the clock application, and wherein causing provision of the haptic feedback comprises causing provision of a frequency of pulses that is proportional to a characteristic of the time indicated by the clock application.

3. The method of claim 1, wherein receiving the indication of the gesture comprises receiving the indication of the touch gesture being performed with respect to a selectable item displayed on the display, and wherein the selectable item is a specific portion of the display associated with a corresponding specific content item.

4. The method of claim 1, wherein receiving the indication of the gesture comprises receiving the indication of the gesture being performed with respect to a selectable item displayed on the display, and wherein the selectable item is any portion of the display associated with the application and directing the feedback response to be applied via the touch screen display.

5. The method of claim 1, wherein causing provision of the haptic feedback comprises referencing a feedback lexicon defining a feedback response to be provided for the status determined for the application.

6. The method of claim 1, wherein the temporal characteristic comprises a frequency or a number of bursts of haptic feedback.

7. An apparatus comprising at least one processor and at least one memory including computer program code, the at least one memory and the computer program code configured to, with the processor, cause the apparatus to at least:
receive an indication of a gesture;
determine a status with respect to an application, in response to receipt of the indication of the gesture, wherein the application comprises a clock application; and
cause provision of haptic feedback that provides information relating to the status that was determined with respect to the application, wherein the at least one memory and the computer program code are configured to, with the processor, cause the apparatus to cause the provision of haptic feedback by causing provision of haptic feedback having one or more characteristics that are indicative of the status determined with respect to the application, wherein a temporal characteristic of the haptic feedback is indicative of a numerical property of the status determined with respect to the application, wherein the gesture is performed by at least two fingers, and comprises a touch gesture with at least two fingers touching a display from initiation of the gesture until recognition of the gesture.

8. The apparatus of claim 7, wherein the at least one memory and computer program code are configured to, with the at least one processor, cause the apparatus to cause provision of the haptic feedback by referencing a feedback lexicon defining a feedback response to be provided for the status determined for the application.

9. A computer program product comprising at least one non-transitory computer-readable storage medium having computer-executable program code instructions stored therein, the computer-executable program code instructions comprising program code instructions for:

receiving an indication of a gesture;
determining a status with respect to an application, in response to receipt of the indication of the gesture, wherein the application comprises a clock application; and
causing provision of haptic feedback that provides information relating to the status that was determined with respect to the application, wherein the program code instructions for causing the apparatus to cause provision of haptic feedback comprise program code instructions for causing provision of haptic feedback having one or more characteristics that are indicative of the status determined with respect to the application, wherein a temporal characteristic of the haptic feedback is indicative of a numerical property of the status determined with respect to the application, wherein the gesture is performed by at least two fingers, and comprises a touch gesture with at least two fingers touching a display from initiation of the gesture until recognition of the gesture.

10. The computer program product of claim 9, wherein the program code instructions for causing provision of the haptic feedback comprise program code instructions for referencing a feedback lexicon defining a feedback response to be provided for the status determined for the application.

11. The method of claim 1, wherein a duration associated with the haptic feedback is dependent upon a number of units of time indicated by the clock application.

12. The method of claim 1, wherein a first set of the haptic feedback is indicative of an hour, and a second set of the haptic feedback is indicative of minutes.

13. The method of claim 1, wherein the status is a time remaining until an alarm, indicated by the clock application, and wherein causing provision of the haptic feedback comprises causing provision of a frequency of pulses that is proportional to a characteristic of the time remaining.

14. The apparatus of claim 7, wherein the status is a time indicated by the clock application, and wherein causing provision of the haptic feedback comprises causing provision of a frequency of pulses that is proportional to a characteristic of the time indicated by the clock application.

15. The computer program product of claim 9, wherein the status is a time indicated by the clock application, and wherein causing provision of the haptic feedback comprises causing provision of a frequency of pulses that is proportional to a characteristic of the time indicated by the clock application.

* * * * *